United States Patent
Keskin et al.

(10) Patent No.: US 11,953,132 B2
(45) Date of Patent: Apr. 9, 2024

(54) HOSE CLAMP

(71) Applicant: KALE BAGLANTI TEKNOLOJILERI SANAYI VE TICARET ANONIM SIRKETI, Istanbul (TR)

(72) Inventors: Özden Keskin, Istanbul (TR); Engin çiçekliyurt, Istanbul (TR)

( * ) Notice: Subject to any disclaimer, the term of this patent is extended or adjusted under 35 U.S.C. 154(b) by 291 days.

(21) Appl. No.: 17/601,969

(22) PCT Filed: Apr. 11, 2019

(86) PCT No.: PCT/TR2019/050238
§ 371 (c)(1),
(2) Date: Oct. 7, 2021

(87) PCT Pub. No.: WO2020/209807
PCT Pub. Date: Oct. 15, 2020

(65) Prior Publication Data
US 2022/0163151 A1     May 26, 2022

(51) Int. Cl.
*F16L 33/207*     (2006.01)
*F16B 2/08*       (2006.01)
*F16L 33/08*      (2006.01)

(52) U.S. Cl.
CPC ............ *F16L 33/2071* (2013.01); *F16B 2/08* (2013.01); *F16L 33/08* (2013.01)

(58) Field of Classification Search
CPC .......... F16L 33/2071; F16L 33/08; F16B 2/08
See application file for complete search history.

(56) References Cited

U.S. PATENT DOCUMENTS

| | | | |
|---|---|---|---|
| 3,407,448 | A | 10/1968 | Tetzlaff et al. |
| 3,477,106 | A | 11/1969 | Tetzlaff et al. |
| 2008/0098572 | A1 | 5/2008 | Krauss |
| 2010/0058563 | A1* | 3/2010 | Col .......... F16L 33/08 285/253 |
| 2011/0005040 | A1* | 1/2011 | Col .......... F16L 33/08 24/16 R |

FOREIGN PATENT DOCUMENTS

DE       3050763 C2   10/1984
DE  202011005200 U1    6/2011

(Continued)

OTHER PUBLICATIONS

International Search Report for corresponding PCT/TR2019/050238, dated Mar. 6, 2020.

(Continued)

*Primary Examiner* — James M Hewitt, II
(74) *Attorney, Agent, or Firm* — Egbert, McDaniel & Swartz, PLLC

(57) ABSTRACT

A hose clamp developed for hose structures used in many fields particularly in the automotive sector. The hose clamp includes a clamp band which surrounds the hose, a clamp housing which engages both ends of said clamp band, at least one positioner clip which limits radial and axial motion of the hose clamp on the hose, a wing with springy feature which is located on the positioner clip and allows diameter reduction of the hose clamp, a structure which couples the positioner clip to the hose by a plurality of serrations and does damage the hose.

10 Claims, 7 Drawing Sheets

(56) References Cited

FOREIGN PATENT DOCUMENTS

| | | |
|---|---|---|
| EP | 2163801 A1 | 3/2010 |
| EP | 1939513 B1 | 8/2012 |
| ES | 2400271 B2 | 8/2013 |
| FR | 2887321 B1 | 12/2008 |
| WO | WO-2018186811 A1 * | 10/2018 |
| WO | 2018210538 A1 | 11/2018 |

OTHER PUBLICATIONS

Written Opinion of the International Searching Authority for corresponding PCT/TR2019/050238, dated Mar. 6, 2020.

* cited by examiner

HOSE CLAMP

TECHNICAL FIELD

The invention is related to a hose clamp which is developed for hoses used in many fields particularly in the automotive industry.

STATE OF THE ART

Many hose configurations for performing various tasks are used in the manufacturing processes in the automotive industry. Most of the hoses used are coupled with various hose clamps to the locations where they will function. For this coupling, two ends of a clamp band are passed through a portion which is called clamp housing, it is performed as a diameter reduction when tightening process is performed by means of a bolt. The internal diameter of the clamp tightens the surface of the hose with the diameter reduction and the hose is fastened on the spigot (coupling piece) which is located on the internal diameter portion of the hose. During this process, the personnel who takes charge in coupling the clamp on the hose by means of tightening the bolt, in order not to change the position of the clamp by applying force, positions the clamp with one hand and tightens the bolt with the other hand by using a tightening device and then attaches the hose clamp. This tightening process is required to be performed by the personnel with one hand. This process with two stages (holding and tightening) extends the mounting process. In the regions where the hand cannot reach, the holding process cannot be performed, so that the mounting process becomes more difficult due to the tightening process to be performed.

In order to eliminate said holding process, a hose clamp is positioned on the hose by performing a pre-securing process. Together with the pre-securing process, the hose clamp which is positioned on the hose can be tightened by the personnel without requirement of holding. During this process, although a force is applied by the personnel during the clamp is coupled on the hose by means of tightening with a bolt; the position of the clamp remains unchanged. The personnel tightens the bolt by means of a tightening device and then attaches the house clamp without bringing the clamp to the tightening position with one hand. Although the clamp moves on the hose after the pre-securing process, it cannot change its position. The tightening process is made by the personnel with one hand. Two-stage (holding and tightening) process is minimized to the tightening process so that mounting period is shortened. Since holding process is not performed, tightening process can be performed in the areas where even the hand cannot reach. The personnel can be able to fasten the clamp on the hose by tightening the bolt of the clamp via the tightening device without holding the clamp.

In patent application No EP2163801 A1, clips located on the clamp band are sunken into the hose from the outer diameter. It is very difficult to mount the clamp which holds clips on itself onto the hose. The clips which are sunken into the hose from the outer diameter cannot be able to prevent the movement of the band during tightening in the radial direction. The movement of the band during tightening is an undesired movement. It leads to an insufficient tightening process. The movement of the band during tightening process is undesired.

In patent application No ES2400271 B2, clip is used in hose clamps. In this application, since clip holds the hose only from one point, the clamp cannot be fixed properly to the hose. In addition to this, since there is no sunken portion within the hose on clip, when tightening force in the axial direction is excessive then the position of the clamp on the hose cannot be maintained.

In the document No EP1939513 B1, hose clamp enables a structure which meets the forces after tightening process in the radial direction but it cannot enable a proper grasping in the axial direction. Since a resistance against the forces to be created in the axial direction is not formed, its performance would be low due to tendency of change in position during tightening process.

Another document included within the prior art is FR2887321 B1. The clamp consists of a clip integrated with the band and a structure which presents a flexible rest system. One fixed clip fastens the hose from only one point as it is in ES2400271 B2. Additionally, it makes a limited positioning in the axial direction with the flexible rest system. This configuration cannot be able to perform sufficient positioning and fastening.

In order to secure the hose clamps to the hoses, there are other alternative configurations in the technical field. In documents with U.S. Pat. No. 3,454,996 A, EP1912007 B1 and EP2017518 B1, clamp mechanisms attached to the hose mechanically with a holding element are disclosed. Said holding element is connected to the bottom portion of the clamp band, it has connection elements in order to secure the hose clamp to the hose. In the configurations mentioned in these documents, one or two holding elements are used. Since this holding element is one or two, sufficient rigidity in the axial direction cannot be enabled. In addition to this, it holds the clamp in the circumferential direction in a weaker manner; it cannot be able to maintain the position of the bolt during the tightening process. Therefore, the mounting operation becomes difficult. On the other hand, the hose clamps included within the disclosed invention in said documents are sunken into the inner layers of the hose and give damage to the hose due to the shape of the fastening clips.

As a result, applications included within the present state of the art and the inventions subject to the current patent applications, cannot be provided sufficient solutions against the problems as followings:

There is no structure which will enable compensation of the diameter difference of the hose and clamp, The clips within the hose clamp cause deformation in the hose or give damage to the hose by sinking into thereof, A rigidity cannot be obtained at a required level for pre-positioning the hose clamp, Mounting difficulties are encountered during tightening of the clamp due to the fact that after the clamp is positioned on the hose, it is not sufficiently rigid in the circumferential direction, The separation of the hose clamp from the hose during transportation or opening the package.

In this sense, many problems and disadvantages are encountered in said technical field, current systems are insufficient in solving said problems and disadvantages. This condition makes it necessary to make an improvement in the technical field.

BRIEF DESCRIPTION OF THE INVENTION

The present invention is related to a hose clamp which fulfills all above-mentioned requirements, eliminates all disadvantages and brings some additional advantages. The main aim of the invention is to mount the clamp via clips onto the hose firmly by means of a pre-positioning process.

By means of the clips attached to the clamp, the clamp is fastened to the hose in a radial and axial direction. The problems known in the present state of the art are solved by means of the springy winged structure and holding the hose by biting without damaging the hose layers features.

During tightening of the hose via the clamp, the clamp band which can be narrowed circumferentially and the wing structures of the positioner clips included within the clamp band are configured in a manner such that they do not affect the tightening force distribution and they do not give damage to the hose. Therefore, on one hand diameter reduction is enabled and on the other hand damage given to the hose is prevented.

Mounting the hose clamp on the hose in a pre-positioning manner is the main aim of the present invention. In this invention, mounting the hose clamp on the hose in advance is significantly facilitated. Substantially, it has at least one piece associated with the hose directed in a radial and axial manner around the hose. In order to eliminate the disadvantages and problems of the current inventions, this invention is also attached to the hose by means of a pawl that bites the hose via a springy wing in the clips attached on the clamp band.

Another aim of the embodiment of this invention is that, the clamp attached to the hose allows diameter reduction during tightening process and enables the coupling between at least one springy wing and the clamp and the hose in order to compensate the diameter reduction. The clamp band has a circular surface with adjustable diameter and the clip is the piece which attached on band. This clip, in order to enable the connection of the clamp to the hose, has a free wing which is not a part of the clamp and does not interfere to the sealing surface of the hose with any portions thereof, can be attached into the hose in order to enable connection of the clip to the hose. This wing is designed in a manner such that it does not affect the tightening force distribution equity of the clamp and also it does not give any damage to the hose. This wing structure is positioned at a certain distance from the outer diameter of the clamp. Said structure is secured to the end portion of the hose in a manner such that it does not give damage to the hose and the function of the clamp. The most important novelty feature of the invention is that, the pawl structure which grasps the hose from its end enables a securing by means of a superficial biting motion without being sunken into the inner layers of the hose. Apart from the springy wing structure, a fixed clip which is non-springy is used in a region close to the housing in order to increase radial rigidity. On the clamp, various numbers of springy winged clips and fixed clips are used in combination by means of placing with various angles in order to enable the required axial and radial rigidity.

The structural and characteristic features of the present invention will be understood clearly by the following drawings and the detailed description made with reference to these drawings and therefore the evaluation shall be made by taking these figures and the detailed description into consideration.

REFERENCE NUMBERS

Figure 1:
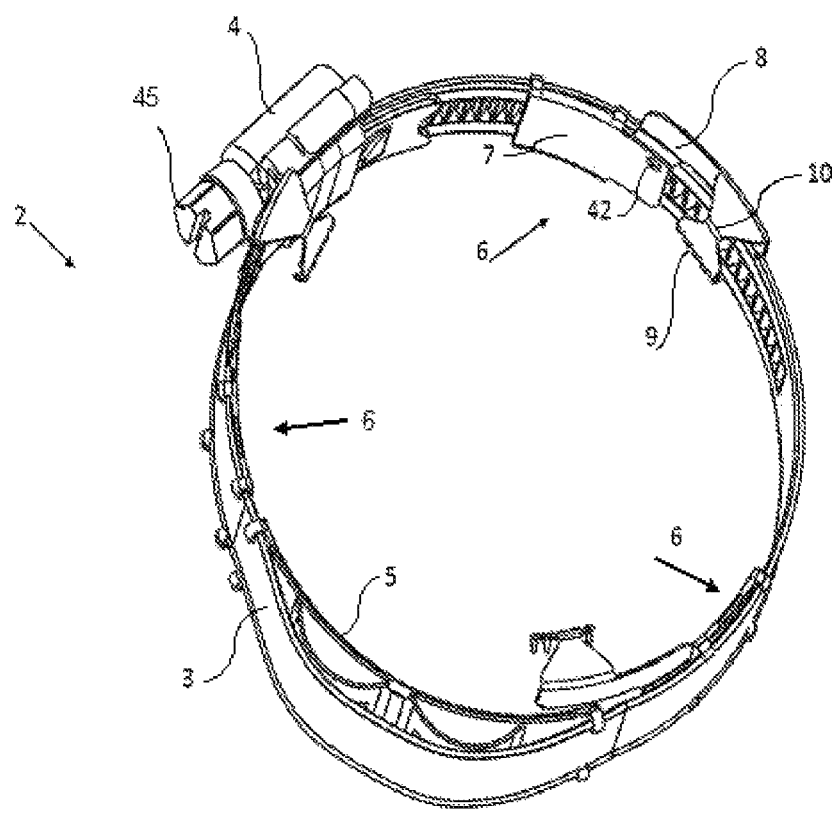
In FIG. 1, a perspective view of the hose clamp on which there are three springy winged positioner clips, is given.

1 Hose
2 Hose Clamp
3 Clamp Band
301 Clamp Band Thickness
302 Clamp Band Upper Surface
4 Clamp Housing
5 Spring Structure
6 Positioner clip
7 Clip Attachment Portion
71 Clip Portion Outer Edge
8 Wing
9 Serration
10 Twisting Stage
101 Discharges
11 Pointed Protrusion
12 Arm
13 Hose End Portion
14 Fixed Clip
15 Fixed Clip Attachment Portion
16 Fixed Clip Threads
17 Lug Structure
171 Elevation
172 Extension
173 Fold edge
18 Side Wall
19 Clip Latch
191 Clip Latch Outer Edge
192 Discharge
20 Support Portion
21 Curved Form
22 Radius form
221 Collecting surface
23 Alternative Clip
24 Internal wing
25 Lug Puller
26 Pointed End
27 Radius Surface
28 Side Lug
29 Hollow Wing
30 Alternative Wing
31 Second alternative clip
32 First Flap
33 Second Flap
34 Hole
35 Sunken Lug to the Hose
36 Positioning Protrusion
37 Third Alternative Clip
38 Ring
39 Outer Lug
40 First Twisting Portion
41 Second Twisting Portion
42 Clip Camber
43 Spigot
44 Axis
45 Bolt

DETAILED DESCRIPTION OF THE INVENTION

In this detailed description, the preferred embodiments of the invention are described only for clarifying the subject matter and are described in a manner without a non-limiting effect.

Figure 9:
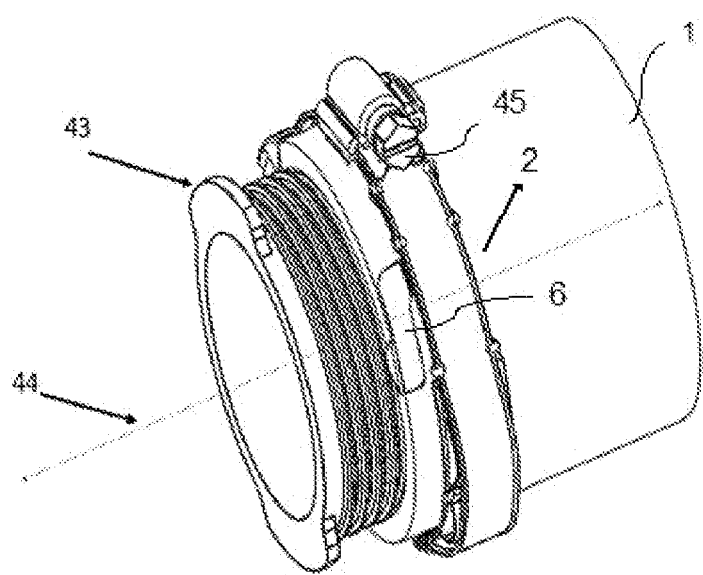
In FIG. 9, a general perspective view which shows the status of the clamp mounted on the hose where spigot is located on its center and the positioner clips is given.

The invention relates to a hose clamp (2) which is developed for hoses (1) used in many fields particularly in the automotive sector. In FIG. 9, a general perspective view which shows the status of the hose clamp (2) mounted on the hose (1) where spigot (43) is located at its center and the positioner clips (6) is given. Said hose clamp (2) is responsible for connecting the hose (1) on a spigot (43) structure. In order to connect the hose (1) on the spigot (43), the hose clamp (2) can be placed on the hose (1) via the positioner clips (6) by means of pre-securing. By this means without holding the hose clamp (2) with hand, it is possible to tighten the hose clamp (2) by means of tightening the bolt (45). When spigot (43) is brought to the same axis (44) with the hose axis (44), it is placed to its required place. When the bolt (45) is tightened with a tightening device, the diameter of the clamp band (3) and the diameter of the hose (1) become equal in a slow manner. When tightening process continues and the diameter of the clamp band (3) decreases to a level lower than the outer diameter of the hose (1), provided that the spigot (43) is at the center, the hose (1) and the hose clamp (2) can move as a single element.

In FIG. 1, a perspective view of the hose clamp (2) on which there are three positioner clips (6), is given. There is a clamp band (3) with a circular form in the structure of said hose clamp (2). Two ends of said clamp band (3) are engaged with clamp housing (4). The clamp housing (4) acts as a structure which unites said clamp band (3), preferably it tightens the clamp band (3) via a bolt (45). Together with performing said tightening process, both ends of the clamp band (3) move in a circular manner in coordination. Therefore, the diameter of said hose clamp (2) reduces and thus tightening of said hose (1) is performed. On the other hand, there is at least one spring structure (5) on the inner portion of said clamp band (3) on the hose clamp (2). It is aimed with said spring structure (5) to protect the tightness of the hose clamp (2) by preventing the changes that may occur in the diameter of the hose clamp (2) due to thermal or another reason. In order to position the hose clamp (2) to the hose (1) in a radial and axial direction, at least one springy positioner clip (6) is used. The positioner clip (6) is located on the clamp band (3) by means of the clip attachment portion (7). The positioner clip (6) plays an important role in providing diameter reduction when said hose clamp (2) compresses the hose (1). This situation will be described in detail later.

Figure 2:
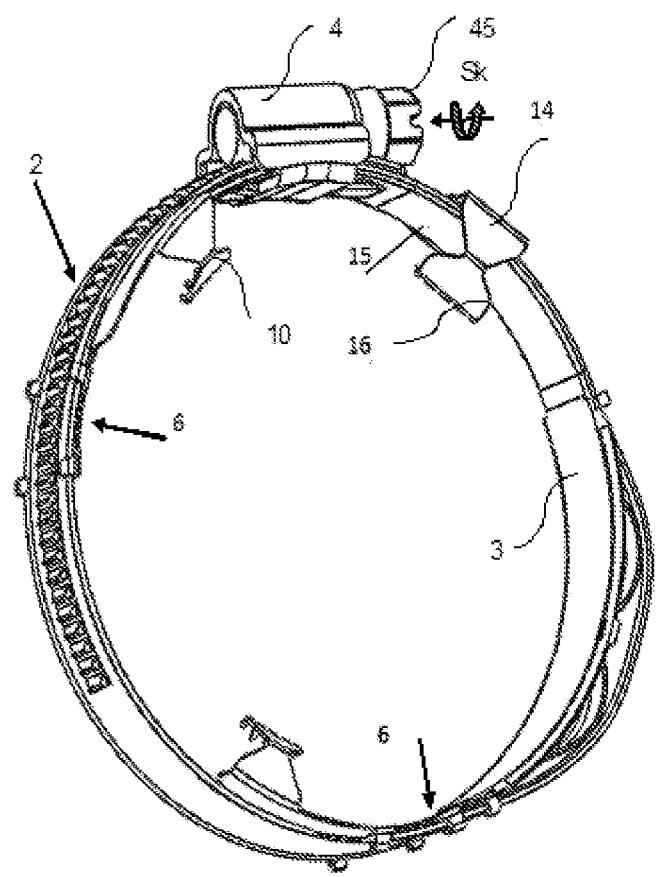
In FIG. 2, a perspective view of the hose clamp on which there are a fixed positioner and two springy winged positioner clips is given.

In FIG. 2, a perspective view of the hose clamp (2) on which there are a fixed positioner clip (14) and two current movable positioner clips (6) is given. Some of the clips (6,14) are fixed on the clamp band (3) in a manner such that they cannot move. In this case, they are named as fixed positioner clips (14). Particularly, when a tightening process (Sk) is performed on the bolt (45) located within the clamp housing (4), by means of the pre-positioning process separation of the hose clamp (2) located on the hose (1) from the hose (1) is not desired. In addition to this, during the tightening process (Sk), apart from the tightening device, holding the hose clamp (2) or the hose (1) is not desired. In order to fulfill this aim, the fixed positioner clip (14) which is located in the portion as much as closer to the clamp housing (4) and on the section where the tightening process (Sk) is performed by means of the tightening device clamp, is fixed on the clamp band (3) in a manner such that it does not create a relative motion between the clamp band and itself (3).

Figure 3:
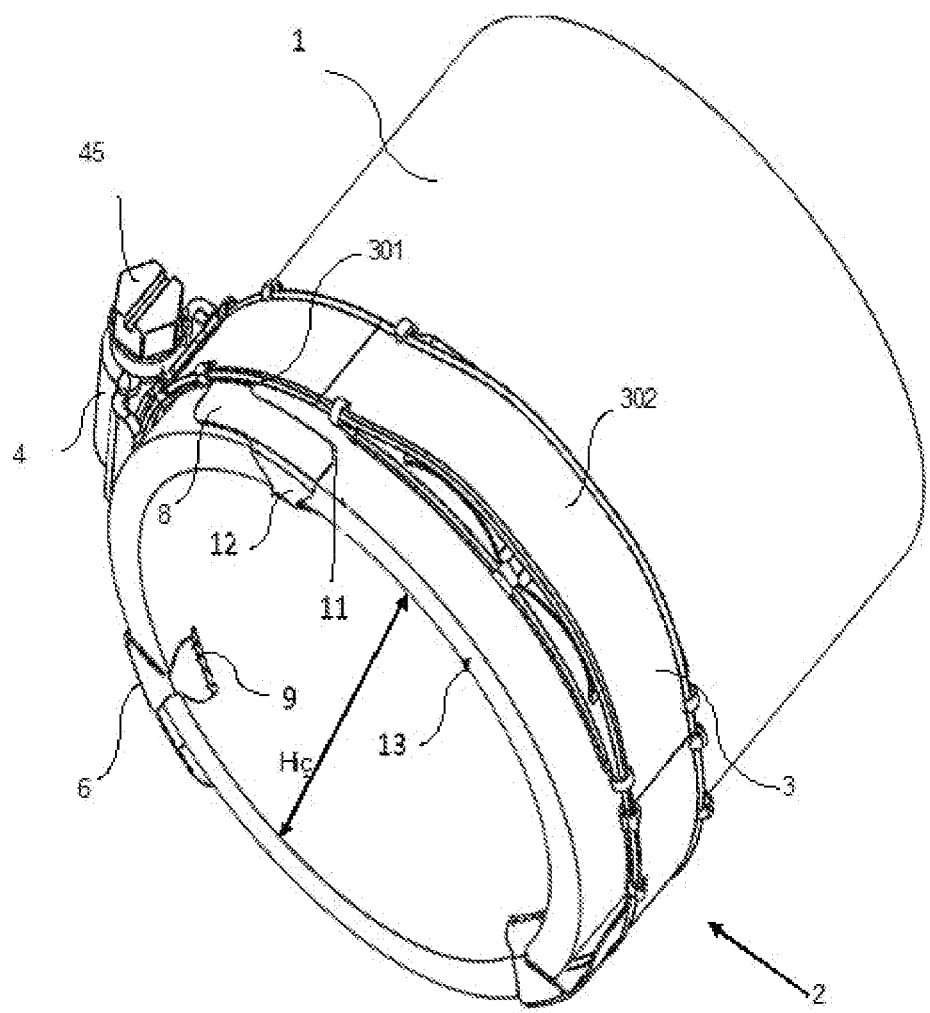
In FIG. 3, a perspective view of the hose clamp mounted on the hose is given.

In FIG. 3, a perspective view of the hose clamp (2) mounted on the hose (1) is given. No fixed positioner clip (14) is used on this hose clamp (2). All positioner clips (6) are selected in a manner such that they have the ability to move on the clamp band (3).

Figure 4:
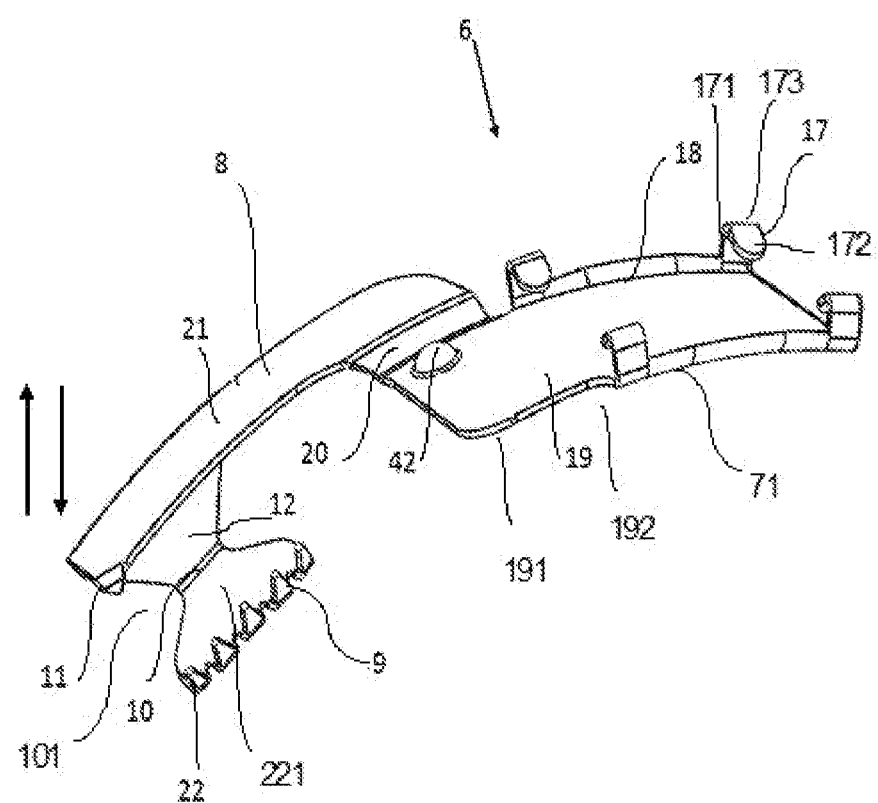
In FIG. 4, a perspective view of the springy winged positioner clip is given.

In FIG. 4, a perspective view of the positioner clip (6) is given. The positioner clip (6) generally consists of a clip attaching portion (7) and a wing (8) portion. In order to attach the positioner clip (6) to the clamp band (3), there is a plurality of lug structure (17) in said clip attaching portion (7), these lug structures (17) both hold the positioner clip (6) on the clamp band (3), and allow the positioner clip (6) move on the clamp band (3) during the tightening process (Sk) of the hose clamp (2). The clip attaching portion (7) has preferably a tetragon and particularly a rectangular form. There are lug structures (17) on four edges of the tetragon. The lug structure (17) consists of an elevation (171) which extends throughout the clamp band thickness (301), a fold edge (173) and an extension (172) which extends throughout the clamp band upper surface (302). When the positioner clip (6) is located in a manner such that the clamp band (3) is between the lugs (17), it may have a freedom of movement on the clamp band (3). This freedom of movement is only valid during the tightening process (Sk) of the hose clamp (2).

When the positioner clip (6) is attached on the clamp band (3), it comprises a springy wing (8) portion which extends throughout the hose end portion (13) from the side surface of the band, and does not correspond to the bottom portion of the clamp band (3). Spring feature of the wing (8) is due to its design structure and material. When the clip attaching portion (7) is attached on the clamp band (3), when a force is applied on the wing (8) portion, its position is changed by means of stretching and when the force is removed then the wing (8) portion returns to its previous condition.

Said wing (8) which has a curved form (21) appropriate to the circular geometry of the clamp band (3), contributes to the diameter reduction during tightening of the hose clamp (2). In addition to this, in order to increase the strength of the springy wing (8), at least one support portion (20) engaged with the wing (8) is provided on the positioner clip (6).

The engagement between the support portion (20) and the clip attaching portion (7) is enabled by means of the clip latch (19). During the tightening process (Sk) in which the hose clamp (2) compresses the hose (1), in order to prevent damage to said hose (1), a discharge (192) is obtained between the clip latch outer edge (191) and the clip portion outer edge (71). Also, in conditions such as packaging, transportation, in order to determine the location of the positioner clip (6) on the clamp band (3), there is at least one clip camper (42) on the clip latch (19). There is a correspondence of the clip camber (42) on the clamp band (3), thus they are compatible in terms of their shapes. In other words, a clip cavity is enabled on the clamp band (3) for placing the clip camber (42). Therefore, before the hose clamp (2) is pre-positioning to the hose (1), due to the freedom of movement of the clip (6), it is allowed to protect its position on the clamp band (3).

An arm (12) is provided on behalf of maintaining the position of the clamp band (3) with hose end portion (13). Said arm (12) is located between the inner diameter of the hose (1) and the clamp band (3), on the curved form (21) of the wing (8). When the hose clamp (2) is attached on the end of the hose (1), in order to facilitate the grasp of the hose (1) by means of twisting and to prevent deformation, a twisting stage (10) is configured on the positioner clip (6). The twisting stage (10) acts for directing the collecting surface (221) to the inner portion of the hose (1). In order to facilitate this directing, discharges (101) are enabled at the right and left sides of the arm (12) for weakening. There are serrations (9) on the end portion of the collecting surface (221) which will sink into the hose (1) from the inner portion of the hose (1). These serrations (9) are sunken to the hose (1), pass through the inner diameter of the hose (1), in a manner of speaking they bite the hose (1). However, said serrations (9) are formed on the hose (1) in a manner such that they do not give damage to hose's (1) surface. A radius form (22) created on the serrations (9), provides their appropriate sinking into the inner surface of the hose (1). The serrations (9) have triangular form; the radius form (22) is created on the end portions. They are aligned side by side on the end portion of the collecting surface (221). At least one pointed protrusion (11) is obtained on the portion which corresponds to said serrations (9) and on the curved form (21). During the pre-positioning process, the hose (1) wall thickness is compressed between the pointed protrusion (11) and serrations (9). This compression can be depicted as biting.

Figure 5:
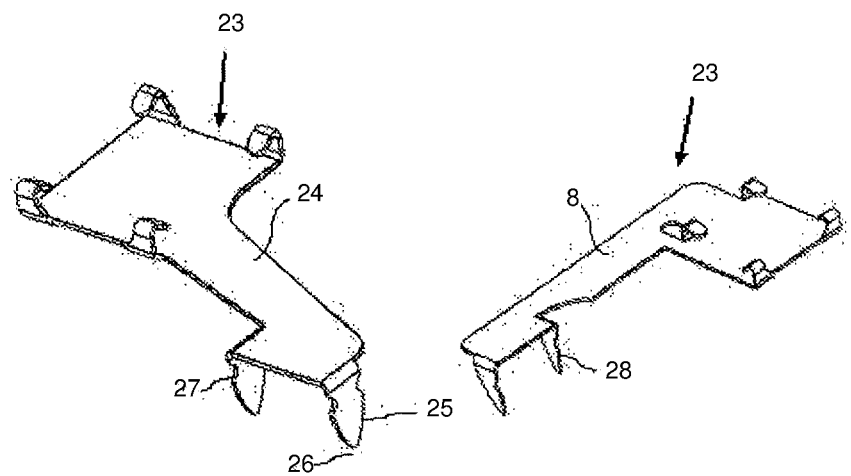
In FIG. 5, FIG. 6 and FIG. 7, perspective views of the alternative positioner clips are given.
Figure 6:
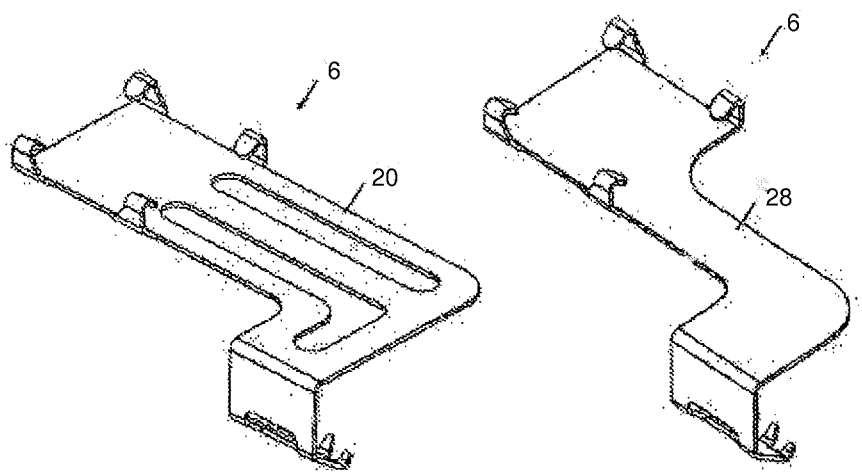
Figure 7:
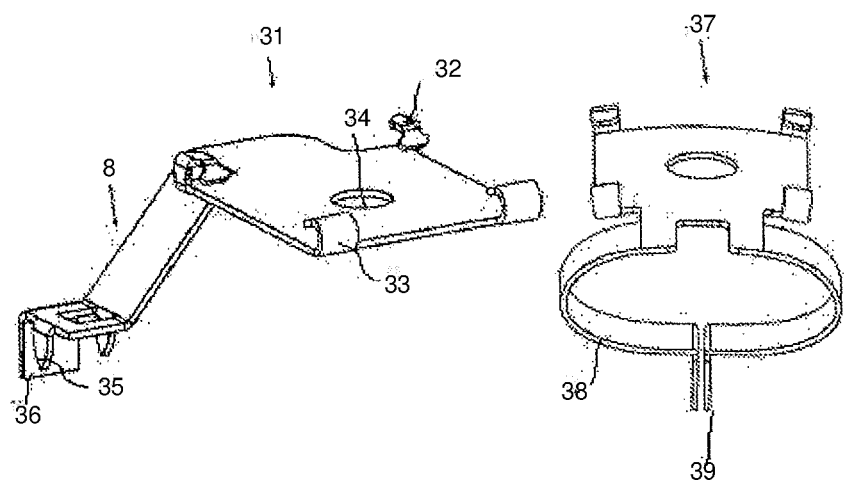

The perspective views of the alternative positioner clips are given in FIG. 5 and FIG. 6 and FIG. 7. In the hose clamp (2) subject to the invention, different alternative configurations can be developed for the positioner clip (6). The alternative clip (23) developed for this aim, different from the positioner clip (6), does not comprise protrusions on the hose end portion (13) such as an arm (12) and a collecting surface (221). In the structure of said alternative clip (23), there is an internal wing (24) with a springy feature instead of a wing (8) which comprises positioner clip (6). Internal wing (24) has a spring structure (5) which is protruded in the inner portion of the alternative clip (23). Also, said alternative clip (23), can easily sink into the outer surface of the hose (1) by means of the lug puller (25) and the pointed end (26) which is included in each lug puller (25) structure. In order to provide sinking into the hose (1) from its side portion, side lug (28) can be positioned alternatively on the alternative clip (23). In addition to this, the radius surface (27) enabled on the surface of the side lug (28) allows twisting while it is sunken into the hose (1).

Figure 8:
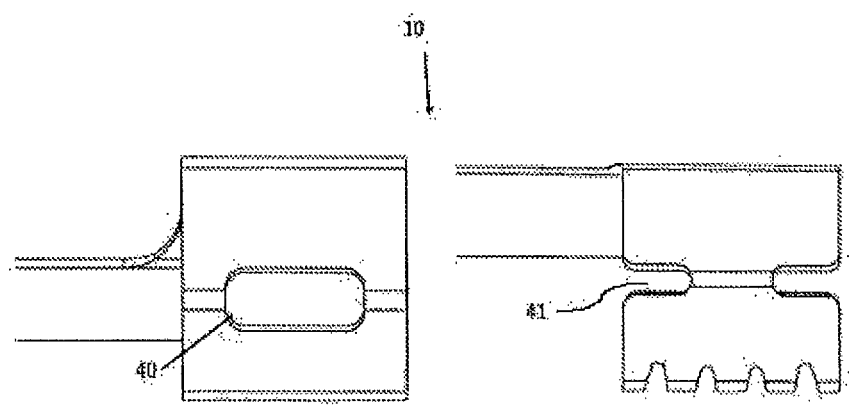
In FIG. 8, general views of the alternative structures developed for facilitating twisting on clip.

In the hose clamp (2) subject to the invention, there may be a single piece, springy hollow wing (29) and an alternative wing (30) structure similar to the internal wing (24). General views of the optional hollow wing (29) and the alternative wing (30) are given in FIG. 6. In FIG. 7, a general view of the second alternative clip (31) and the third alternative clip (37) developed as an alternative for the positioner clip (6) is given. On said second alternative clip (23), in order to enable engagement to the clamp band (3), the first flap (32) and the second flap (33) structures are developed. In the structure of the second alternative clip (31), in order to provide sinking to the hose (1), there are positioning protrusion (36) structures in order to maintain distance with the sunken lug to the hose (35) and hose end portion (13). On the other hand, the hole (34) formed on the second alternative clip (31) and the third alternative clip (37) is used for positioning said second alternative clip (31) and third alternative clip (37) during transportation. In the hose clamp (2) subject to the invention, instead of springy wing (8), a ring (38) with spring feature may be used. The outer lug (39) structure located at the bottom portion of said ring (38) is responsible for sinking into the hose (1) from its outer diameter. Also, within the scope of the invention, two alternative configurations are created for the V shaped twisting stage (10) which is developed for facilitating the grasp of the hose (1) by means of twisting and for preventing the deformation. These are named as the first twisting portion (40) and the second twisting portion (41). Said first twisting portion (40) and the second twisting portion (41) which comprises gap or gaps within or at edge portions are given in FIG. 8.

The springy winged positioner clip (6) included within the structure of the hose clamp (2) in the scope of the invention can be used as a fixed positioner clip (14), a first alternative clip (23), a second alternative clip (31), a third alternative clip (37) or with different combinations thereof.

The invention claimed is:

1. A clamp for a hose, the clamp comprising:
   a clamp band adapted to surround the hose, said clamp band having opposite ends;
   a clamp housing engaged with the opposite ends of said clamp band;
   at least one positioner clip positioned on said band so as to limit radial motion and axial motion of the clamp;
   a wing positioned on said at least one positioner clip, said wing being resilient and adapted to reduce a diameter of the clamp;
   a plurality of serrations formed on said at least one positioner clip, the plurality of serrations adapted to sink into the hose;
   a fixed clip fixed onto said clamp band;
   a first clip having a resilient internal wing, said first clip having at least one leg puller adapted to sink into the hose, said first clip having a pointed end formed at a bottom of the at least one leg puller;
   a second clip having a resilient wing, said second clip having at least one first flap or at least one second flap engageable with said clamp band, said second clip having at least one sunken lug adapted to sink into the hose; and
   a third clip having at least one resilient ring, said third clip having at least one first flap or at least one second flap engageable with said clamp band, said third clip having at least one outer lug adapted to sink into the hose.

2. The clamp of claim 1, further comprising:
   a spring structure located on an inner portion of said clamp band that is adapted to contact the hose, said spring structure extending throughout said clamp band.

3. The clamp of claim 1, wherein each of said plurality of serrations has a radius formed on an end thereof.

4. The clamp of claim 1, further comprising:
   an arm positioned so as to maintain a distance between said clamp band and an end portion of the hose.

5. The clamp of claim 3, further comprising:
   at least one pointed protrusion on each of said plurality of serrations and on the radius formed on each of said plurality of serrations.

6. The clamp of claim 1, wherein said wing is an internal wing.

7. The clamp of claim 1, wherein said wing is a hollow wing.

8. The clamp of claim 1, wherein said wing is a first wing and a second wing.

9. The clamp of claim 1, wherein said clamp band has a circular shape.

10. The clamp of claim 1, further comprising:
at least one clip camber positioned on said at least one positioner clip, said at least one clip camber adapted to determine a location on said clamp band.

* * * * *